United States Patent [19]
Dumont et al.

[11] Patent Number: 4,462,526
[45] Date of Patent: Jul. 31, 1984

[54] CONTINUOUS BRIQUET SHEET SEPARATOR

[75] Inventors: Kenneth R. Dumont, Charlotte; Jack R. Robinson, Pineville, both of N.C.

[73] Assignee: Midrex Corporation, Charlotte, N.C.

[21] Appl. No.: 388,374

[22] Filed: Jun. 14, 1982

[51] Int. Cl.³ .................. B26F 3/00; B02C 13/22; B26D 1/24; B23D 19/06
[52] U.S. Cl. ................................ 225/4; 264/118; 264/140; 264/144; 425/294; 425/297; 425/308; 83/345; 83/408; 83/500
[58] Field of Search .............. 83/345, 408, 500; 225/4, 94; 264/118, 140, 144; 425/294, 297, 308

[56] References Cited
U.S. PATENT DOCUMENTS

| 454,353 | 6/1891 | Hine | 83/346 X |
|---|---|---|---|
| 3,480,189 | 11/1969 | Topolski et al. | 225/4 |
| 3,677,683 | 7/1972 | Harris | 264/118 X |
| 4,165,978 | 8/1979 | Sanzenbacher et al. | 264/118 X |

Primary Examiner—E. R. Kazenske
Assistant Examiner—Taylor Ross
Attorney, Agent, or Firm—Ralph H. Dougherty

[57] ABSTRACT

A briquet sheet from a briquetting machine is subjected to shearing forces to sever the longitudinal webs of the sheet and subsequently, to bending forces to fracture the remaining transverse webs. The separator apparatus includes a pair of shear rolls with alternate shear lands and smaller diameter idler rolls. The shear rolls are followed by a pair of lobed separator rolls.

2 Claims, 5 Drawing Figures

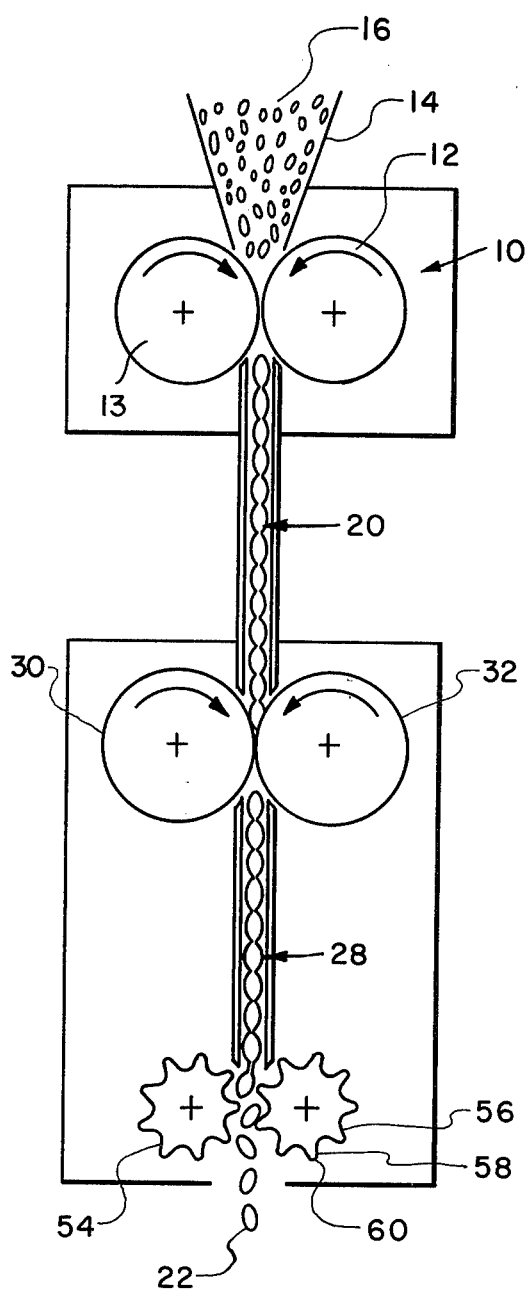
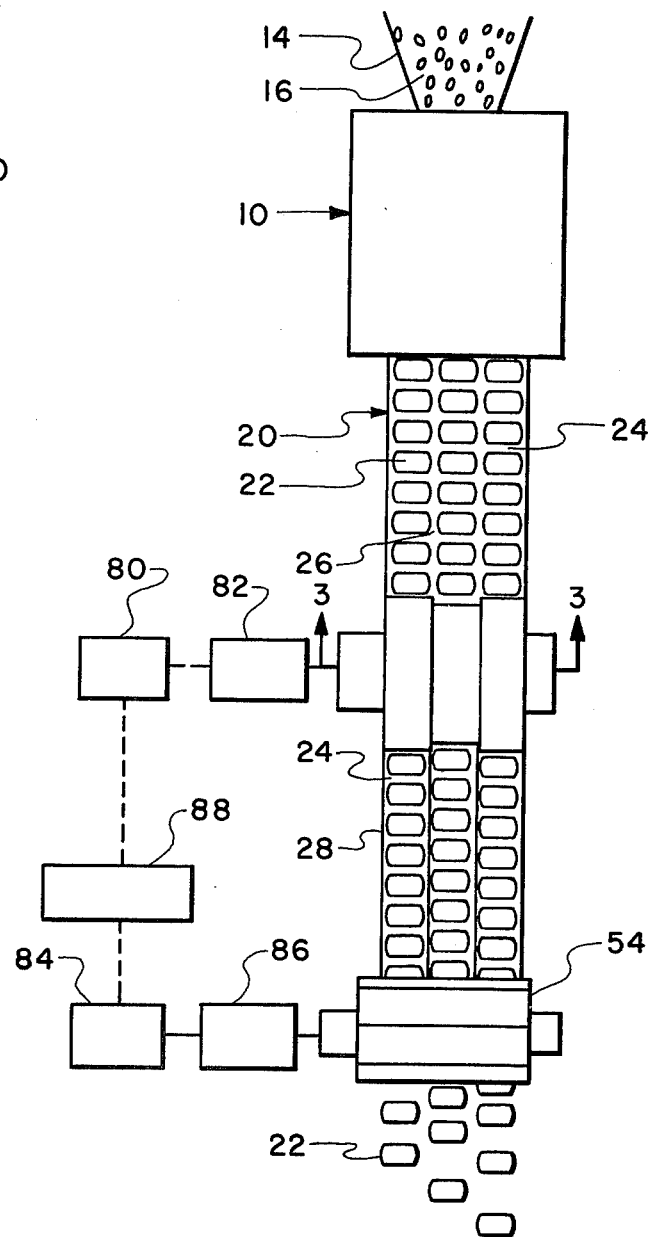
Fig. 1
Fig. 2

CONTINUOUS BRIQUET SHEET SEPARATOR

The present invention pertains to the briquetting of particulate materials and, more particularly, to the separation of sheets of connected briquets into individual briquets.

BACKGROUND OF THE INVENTION

When particulate material such as reduced iron oxide is agglomerated with conventional briquetting rolls, the individual briquets are in generally uniform rows and columns connected by webs of agglomerated material, forming a continuous sheet. For handling and transporting the briquets, the sheets must be separated into individual briquets. A number of approaches to the separation of the briquet sheet into individual briquets are disclosed in the prior art. The use of impacting rolls is taught in U.S. Pat. No. 3,986,864; breaking by means of a rotating impact roll is taught in U.S. Pat. No. 3,300,815; the combination of impacting and bending the sheet emerging from the briquetting rolls is taught in U.S. Pat. No. 3,713,763; and bending the briquet sheet both longitudinally and transversely to fracture the connecting webs is taught in U.S. Pat. No. 4,165,978.

As is discussed in greater detail in the last mentioned patent, the strength of the connecting webs of metallized iron briquets is much stronger than that of the briquets. It is, accordingly, difficult to separate the briquet sheet efficiently into single briquets without crushing or irregularly breaking the briquets.

OBJECTS OF THE INVENTION

It is the primary object of the present invention to provide apparatus for efficiently and reliably separating briquet sheets to produce uniform briquets.

It is also an object to provide a method for the separation of briquets from sheets thereof.

BRIEF SUMMARY OF THE INVENTION

The above objects are achieved by a two part separating process involving first severing the longitudinal webs to produce strings of briquets connected end-to-end and, subsequently, severing the connecting webs of the strings. In the preferred embodiment, the longitudinal webs are sheared, the sheet of connected briquets from a briquetting machine passing through a set of shear rolls. The strings of briquets emerging from the shear rolls are bent to fracture the remaining transverse webs, by means of synchronized, lobed separating wheels or rolls.

For a more complete understanding of the invention and the object and advantages thereof, reference should be had to the following detailed description and accompanying drawings wherein a preferred embodiment of the invention is described and illustrated.

BRIEF DESCRIPTION OF THE DRAWINGS

In the drawings

FIG. 1 is a schematic side elevational view of a briquet forming apparatus incorporating the briquet sheet separator of the present invention;

FIG. 2 is a schematic front elevational view of the apparatus of FIG. 1;

DETAILED DESCRIPTION OF THE PREFERRED EMBODIMENT

Figure 3:
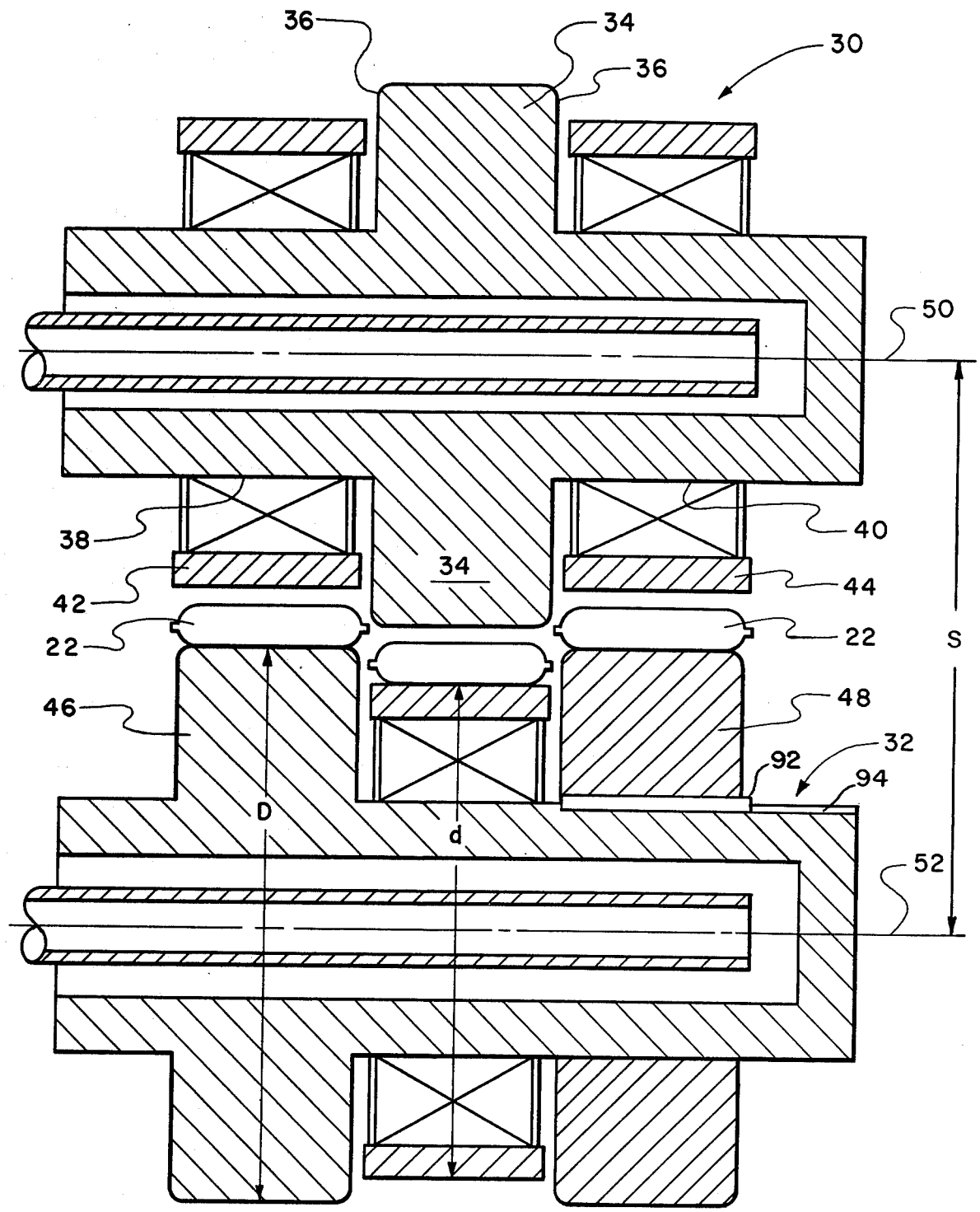
FIG. 3 is a transverse sectional view taken along the lines 3—3 of FIG. 2 and showing the shear roll assembly.

The apparatus of FIGS. 1 and 2 includes a briquetting machine 10 of conventional construction and having a pair of briquetting rolls 12, 13 supplied, via feed hopper 14, with particulate material 16, such as reduced iron oxide. The action of the rolls 12, 13 agglomerates the particulate material 16 into a continuous sheet, designated generally by the numeral 20, which consists of generally pillow-shaped briquets 22 connected by transverse and longitudinal webs 24 and 26, respectively. Reference should be had to U.S. Pat. No. 4,165,978, Sanzenbacher et al, for a more complete discussion of the briquetting process and the characteristics of the briquet sheet.

While the briquetting machine 10 has rolls configured to produce pillow-shaped briquets, it will be understood that the invented sheet separating apparatus is equally capable of separating briquets from sheets produced by other briquetting machines such as those producing D-shaped briquets. Likewise, an intervening operation may be performed intermediate the sheet forming and separating operations. For example, where the sheet 20 emerging from the briquetting machine is at an elevated temperature, the sheet may be quenched prior to separation to cool the webs to render them more brittle.

The continuous sheet 20 of briquets is first separated by severing the longitudinal webs 26 to produce strands 28, each consisting of a single width of briquets connected by the remaining transverse webs 24. To effect this initial separation, the sheet 20 of briquets is passed between a set of shear rolls 30, 32 so configured to impose shearing forces on the longitudinal webs 26 by displacing the rows of briquets alternately from the plane of the sheet 20.

Referring to FIG. 3, a set of shear rolls designed for separating a sheet three briquets in width into three strands, each a single briquet in width, is illustrated. The first shear roll 30 has a central shear land 34 and two reduced diameter portions 38, 40 on opposite sides at the axial centers of the lands and of the reduced diameter portions being aligned with corresponding center lines of alternate rows of briquets. The shear circumferential edges of the shear land 34 may be radiused as at 36. Journaled on the reduced diameter portions 38, 40 are idler rolls 42, 44. The second shear roll 32 is of complementary configuration, each land 46, 48 of this roll being aligned with an idler roll 42, 44 of the first roll 30. The rolls 30 and 32 are journaled for rotation on parallel axes 50, 52. The axial separation S of the rolls, the diameters D and d of the lands and idler rolls, respectively, are so selected that the separation between a land and a mating idler roll is slightly greater than the thickness of an average briquet, whereby the planes of the individual rows of briquets will be displaced from one another by a distance sufficient to assure shearing of the intervening longitudinal webs of the briquet sheet.

As the briquet sheet 20 passes between the shear rolls 30, 32, the briquets of adjacent rows are displaced in opposite directions out of the plane of the sheet. The resulting shear forces are concentrated in the longitudinal webs 24 which shear, separating the briquet sheet into strands, each a single briquet in width.

Figure 4:
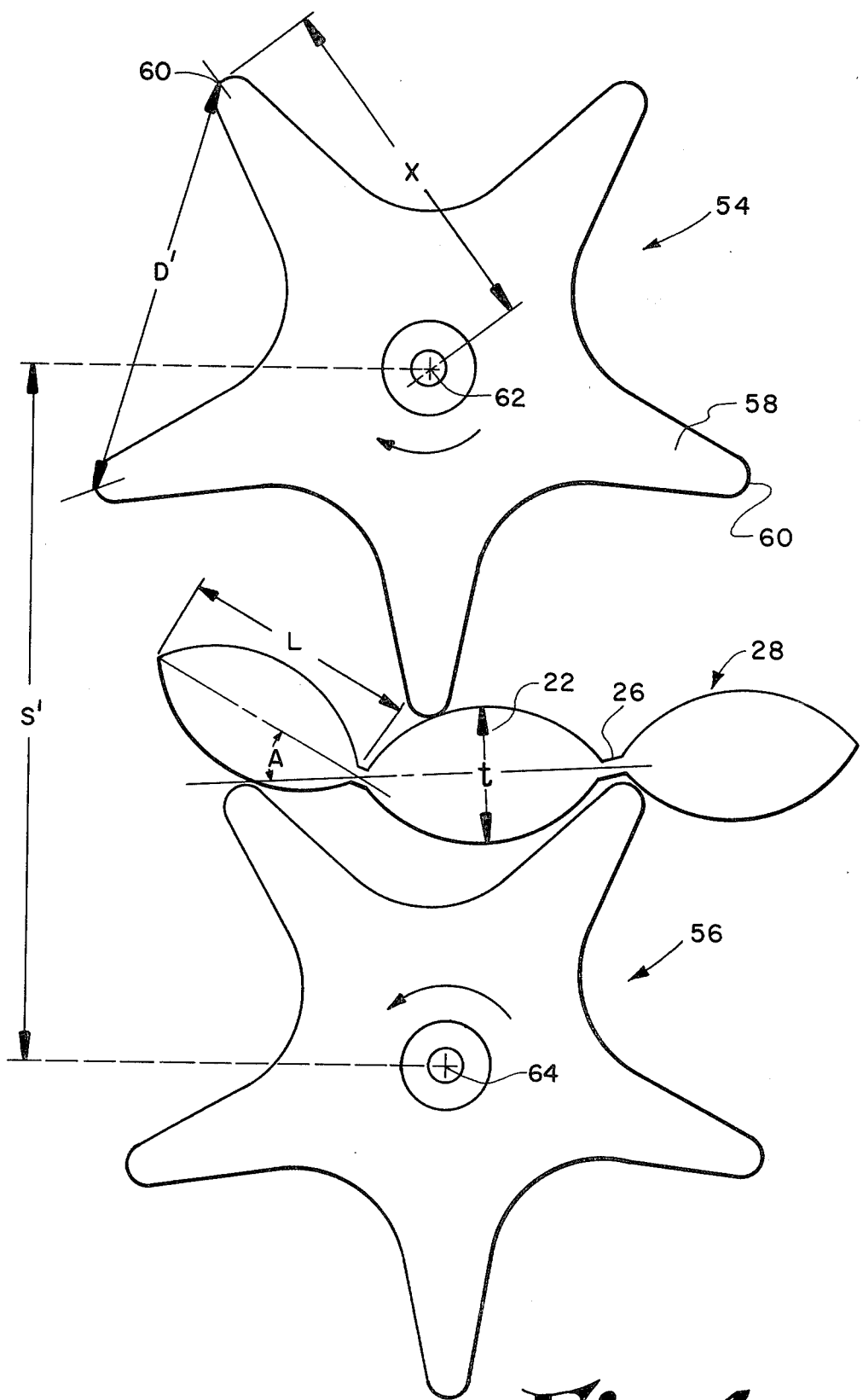
FIG. 4 is a fragmentary, schematic side elevational view of the briquet string separating rolls, on an enlarged scale relative to FIG. 1.

Further separation of strands 28 into single briquets is accomplished by means of separating rolls 54 and 56, which are identical and are symmetrical about their centers. As can be seen from FIGS. 1 and 4, the roll 54 has a plurality of equispaced longitudinal ribs or lobes 58 having rounded points 60. The distance D' between adjacent points is greater than the length L of a single briquet but less than the length of two briquets, preferably about midway between these limits. The separating rolls 54 and 56 are journaled on parallel axes 62, 64 and interconnected for synchronous, opposite rotation. The axes are separated by a distance S' which can vary from twice the distance x to twice x plus one-eighth the thickness t of a briquet 20. This can be expressed by the following equation:

$$2x < S' < 2x + t/8$$

The separator rolls are timed by a suitable power train so that the lobes of the first roll 54 mesh with the midpoint between adjacent lobes of the second roll 56.

As the single briquet wide strands 28 pass through the separator rolls 54, 56, the endmost briquets are subjected to bending forces by the successive lobes to generate breaking stresses in the connecting transverse web portion 26. The separator rolls are configured such that the exit path of the briquets diverges from the entry path to effect a bending of the successive briquets. Preferably the bending angle is from about 10° to about 20° between adjacent briquets.

As is indicated in FIG. 2 the shear roll set 30, 32 is driven by a DC motor 80 through gear reducer 82 and the separator roll pair 54, 56 by DC motor 84 through gear reducer 86, the motor being controlled by controller 88. The peripheral speed of the shear rolls is, preferably, greater than the linear speed of the sheared briquet strip.

ALTERNATIVE EMBODIMENTS

Figure 5:
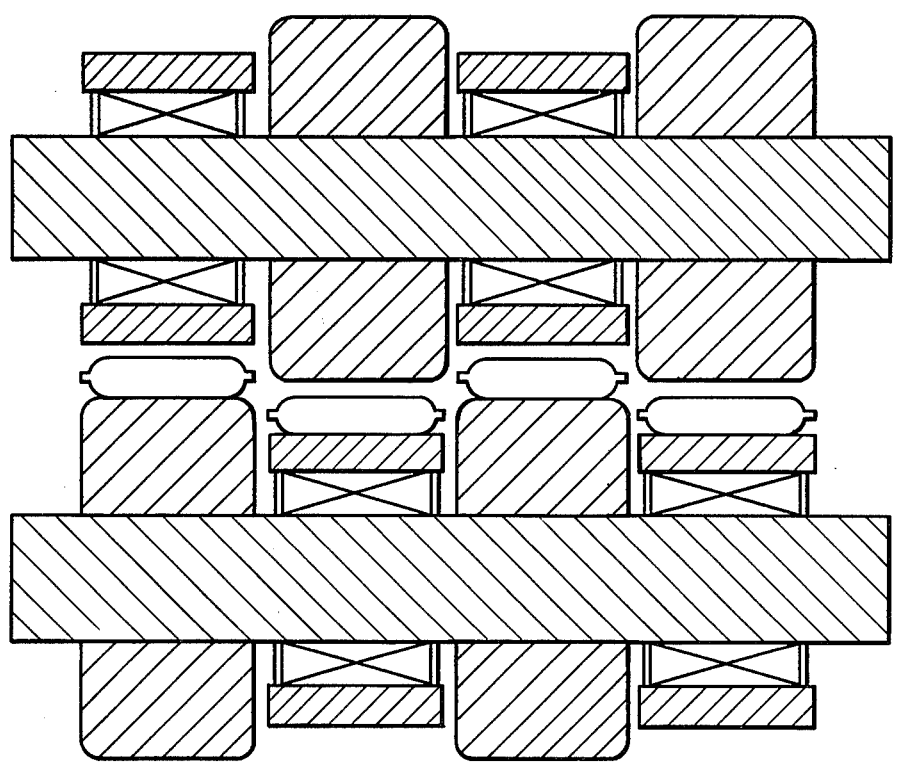
FIG. 5 is a transverse sectional view similar to that of FIG. 3 but showing a modified shear roll assembly.

It will be readily apparent that, while the above described embodiment of the invention is constructed to separate a sheet three briquets in width, the apparatus may be modified to accomodate sheets of other widths. A shear roll configured for a four briquet wide sheet is shown in FIG. 5. If it is necessary or desired to form either roll 30 or 32 by placing rings on a shaft to form lands, these rings may be keyed in place by key 92 in slot 94 as shown in FIG. 3.

The invented apparatus is suited for separating any material which when briquetted results in sheets of briquets connected by longitudinal and/or transverse webs. As other modifications may be made in and to the preferred embodiment, reference should be had to the appended claims in determining the true scope of the invention.

What is claimed is:

1. Apparatus for separating individual metallized iron briquets from a sheet consisting of briquets in generally uniform rows and columns connected by longitudinal and transverse webs comprising:

(a) shear roll means for severing the longitudinal webs of said sheet comprising a pair of shear rolls journaled on parallel axes transverse of the longitudinal webs, the first of said shear rolls having shear lands adapted to align with alternate rows of briquets and reduced diameter portions adapted to align with the remaining rows of briquets, the second of said shear rolls having like shear lands and reduced diameter portions in reverse order from said first roll to mate therewith, the roll spacing and configuration defining a gap in which the briquets of adjacent rows are displaced in opposite directions from said sheet; and (b) lobed roll means for fracturing the transverse webs, comprising a pair of lobed rolls journaled on parallel axes parallel to the transverse webs, each lobed roll having a plurality of equispaced, transversely extending lobes, adjacent lobes being separated by a distance between the length of one and two briquets, and means interconnecting said lobed rolls to rotate in synchronization with the lobes of one said lobed roll meshing with the midpoint between adjacent lobes of the other said lobed roll, the radial lengths of said lobes and the separation of the parallel axes being selected such that the exit path from said lobed roll means diverges from the entry path thereof by a small acute angle.

2. The apparatus of claim 1 wherein said angle is within a range of 10° to 20°.

* * * * *